(12) United States Patent
Cho

(10) Patent No.: US 12,542,979 B2
(45) Date of Patent: Feb. 3, 2026

(54) METHOD OF REMOVING INTERFERENCE AND ELECTRONIC DEVICE PERFORMING THE METHOD

(71) Applicant: SAMSUNG ELECTRONICS CO., LTD., Suwon-si (KR)

(72) Inventor: Sehyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 18/100,086

(22) Filed: Jan. 23, 2023

(65) Prior Publication Data
US 2023/0199328 A1 Jun. 22, 2023

Related U.S. Application Data

(63) Continuation of application No. PCT/KR2022/020289, filed on Dec. 14, 2022.

(30) Foreign Application Priority Data

Dec. 21, 2021 (KR) .................. 10-2021-0183685
Feb. 3, 2022 (KR) .................. 10-2022-0014069

(51) Int. Cl.
*H04N 23/81* (2023.01)
*G02B 27/01* (2006.01)
(Continued)

(52) U.S. Cl.
CPC ......... *H04N 23/81* (2023.01); *G02B 27/0172* (2013.01); *H04N 23/71* (2023.01);
(Continued)

(58) Field of Classification Search
None
See application file for complete search history.

(56) References Cited

U.S. PATENT DOCUMENTS 10,057,501 B2 * 8/2018 Onodera ............. H04N 23/745
2003/0197790 A1 10/2003 Bae
(Continued)

FOREIGN PATENT DOCUMENTS

CN 100516987 C * 7/2009
GB 2445365 A * 7/2008 ................ B60J 3/04
(Continued)

OTHER PUBLICATIONS

Search Report dated Mar. 14, 2023 issued in International Patent Application No. PCT/KR2022/020289.

*Primary Examiner* — Quan Pham
(74) *Attorney, Agent, or Firm* — Nixon & Vanderhye P.C.

(57) ABSTRACT

A method of reducing interference and an electronic device performing the method are provided. An electronic device may include: a sensor module including at least one sensor configured to identify illuminance of an external environment, a processor operatively connected to the sensor module, and a memory operatively connected to the processor and storing instructions executable by the processor. The processor may be configured to: identify the illuminance in a plurality of frames using the sensor module; determine, based on the illuminance, whether interference is present by an external light source that periodically emits light; identify, based on the illuminance, a light emitting period of the
(Continued)

external light source; and control, based on the light emitting period, an operation of the sensor module such that the interference by the external light source does not occur.

5 Claims, 7 Drawing Sheets

(51) Int. Cl.
    *H04N 23/71*          (2023.01)
    *H04N 23/73*          (2023.01)
    *H04N 23/745*        (2023.01)
    *H04N 23/951*        (2023.01)
    *H04N 25/00*          (2023.01)

(52) U.S. Cl.
    CPC ........... *H04N 23/73* (2023.01); *H04N 23/745* (2023.01); *H04N 23/951* (2023.01); *H04N 25/00* (2023.01); *G02B 2027/0118* (2013.01); *G02B 2027/014* (2013.01); *G02B 2027/0178* (2013.01)

(56) References Cited

U.S. PATENT DOCUMENTS

| | | | |
|---|---|---|---|
| 2006/0158531 A1* | 7/2006 | Yanof | H04N 23/71 |
| | | | 348/226.1 |
| 2007/0153094 A1* | 7/2007 | Noyes | H04N 23/745 |
| | | | 348/E5.041 |
| 2022/0116530 A1* | 4/2022 | Zhou | G06T 7/12 |
| 2024/0031686 A1* | 1/2024 | Koike | H04N 23/745 |

FOREIGN PATENT DOCUMENTS

| | | |
|---|---|---|
| KR | 10-0576915 | 5/2006 |
| KR | 10-2010-0093587 | 8/2010 |
| KR | 10-1564076 | 10/2015 |
| KR | 10-2017-0007485 | 1/2017 |
| KR | 10-2018-0084686 | 7/2018 |
| KR | 10-2086509 | 3/2020 |
| KR | 10-2021-0084687 | 7/2021 |
| KR | 10-2280603 | 7/2021 |
| KR | 10-2021-0100345 | 8/2021 |

\* cited by examiner

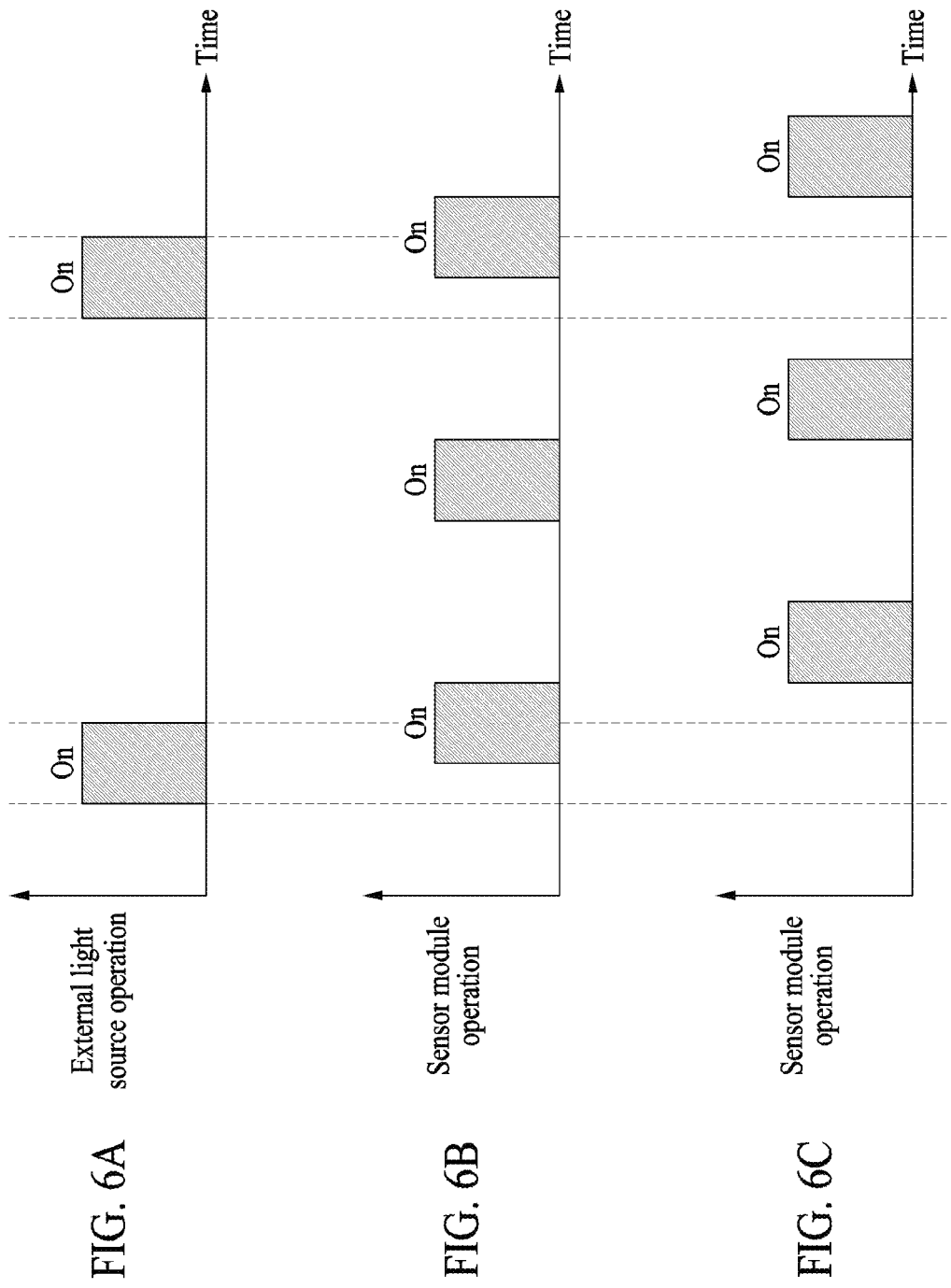

* # METHOD OF REMOVING INTERFERENCE AND ELECTRONIC DEVICE PERFORMING THE METHOD

CROSS-REFERENCE TO RELATED APPLICATIONS

This application is a continuation application of International Application No. PCT/KR2022/020289 designating the United States, filed on Dec. 14, 2022, in the Korean Intellectual Property Receiving Office and claiming priority to Korean Patent Application No. 10-2021-0183685, filed on Dec. 21, 2021, in the Korean Intellectual Property Office, and to Korean Patent Application No. 10-2022-0014069, filed on Feb. 3, 2022, in the Korean Intellectual Property Office, the disclosures of all of which are incorporated by reference herein in their entireties.

BACKGROUND

1. Field

The disclosure relates to a method of removing interference and an electronic device performing the method.

2. Description of Related Art

Image sensors operate based on set frames and obtain an image by receiving external light. An electronic device for augmented reality (AR), virtual reality (VR), mixed reality (MR), or extended reality (XR) may perform three-dimensional (3D) spatial recognition and head/hand tracking using an image sensor.

The electronic device may function as an illuminance sensor for measuring illuminance of a surrounding environment and adjust the transmittance of visors or the brightness of displays of an AR device according to measured illuminance.

When an external system (e.g., a Lidar system, a portable device having a low-illuminance infrared (IR) light source, or an IR security camera) having a light-emitting diode (e.g., an IR light-emitting diode) is adjacent to an electronic device, a sensor module may be subjected to interference by an on/off operation of the light-emitting diode of the external system.

SUMMARY

Embodiments of the disclosure provide a method of removing interference and an electronic device that may exclude interference by an external light source while illuminance of an external environment is being measured, may be provided.

According to an example embodiment, an electronic device may include a sensor module configured to identify illuminance of an external environment. The electronic device may include a processor operatively connected to the sensor module. The electronic device may include a memory operatively connected to the processor and storing instructions executable by the processor. The processor may be configured to: identify the illuminance in a plurality of frames using the sensor module; identify, based on the illuminance, whether interference is present by an external light source that periodically emits light; identify, based on the illuminance, a light emitting period of the external light source; and control, based on the light emitting period, an operation of the sensor module such that the interference by the external light source does not occur.

According to an example embodiment, an electronic device may include a sensor module configured to identify illuminance using a plurality of images obtained by capturing an external environment. The electronic device may include a processor operatively connected to the sensor module. The electronic device may include a memory operatively connected to the processor and storing instructions executable by the processor. The processor may be configured to: identify the illuminance for each of a plurality of pixels included in the plurality of images in a plurality of frames; determine, based on the illuminance, whether interference is present by an external light source that periodically emits light; identify, based on the illuminance, a light emitting period of the external light source; and change, based on the light emitting period, the plurality of frames or a start time point in or at which the sensor module identifies the illuminance such that the interference by the external light source does not occur.

According to an example embodiment, a method of removing interference may include: identifying illuminance of an external environment in a plurality of frames using a sensor module; determining, based on the illuminance, whether interference is present by an external light source that periodically emits light; identifying, based on the illuminance, a light emitting period of the external light source; controlling, based on the light emitting period, an operation of the sensor module such that the interference by the external light source does not occur.

According to various example embodiments described herein, it may be possible to prevent and/or reduce interference by a light-emitting diode of an external system from degrading performance of a sensor module while three-dimensional (3D) recognition or head/and tracking are being performed or illuminance of an external environment is being measured.

According to various example embodiments described herein, interference by an external light source may be excluded by calculating a period of a change in illuminance measured by the external light source to predict an operation period of the external light source and by operating a sensor module using the predicted period of the external light source.

According to various example embodiments described herein, interference by an external light source may be excluded while illuminance of an external environment is being measured, performance of head/hand tracking may be improved by increasing accuracy of illuminance measuring and by obtaining a clear image from an image sensor, and brightness of a display or transmittance of a visor may be controlled according to the measured illuminance.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A, 6B and 6C are diagrams illustrating an example operation of an electronic device to control a start time point of a sensor module according to various embodiments.

DETAILED DESCRIPTION

Figure 1:
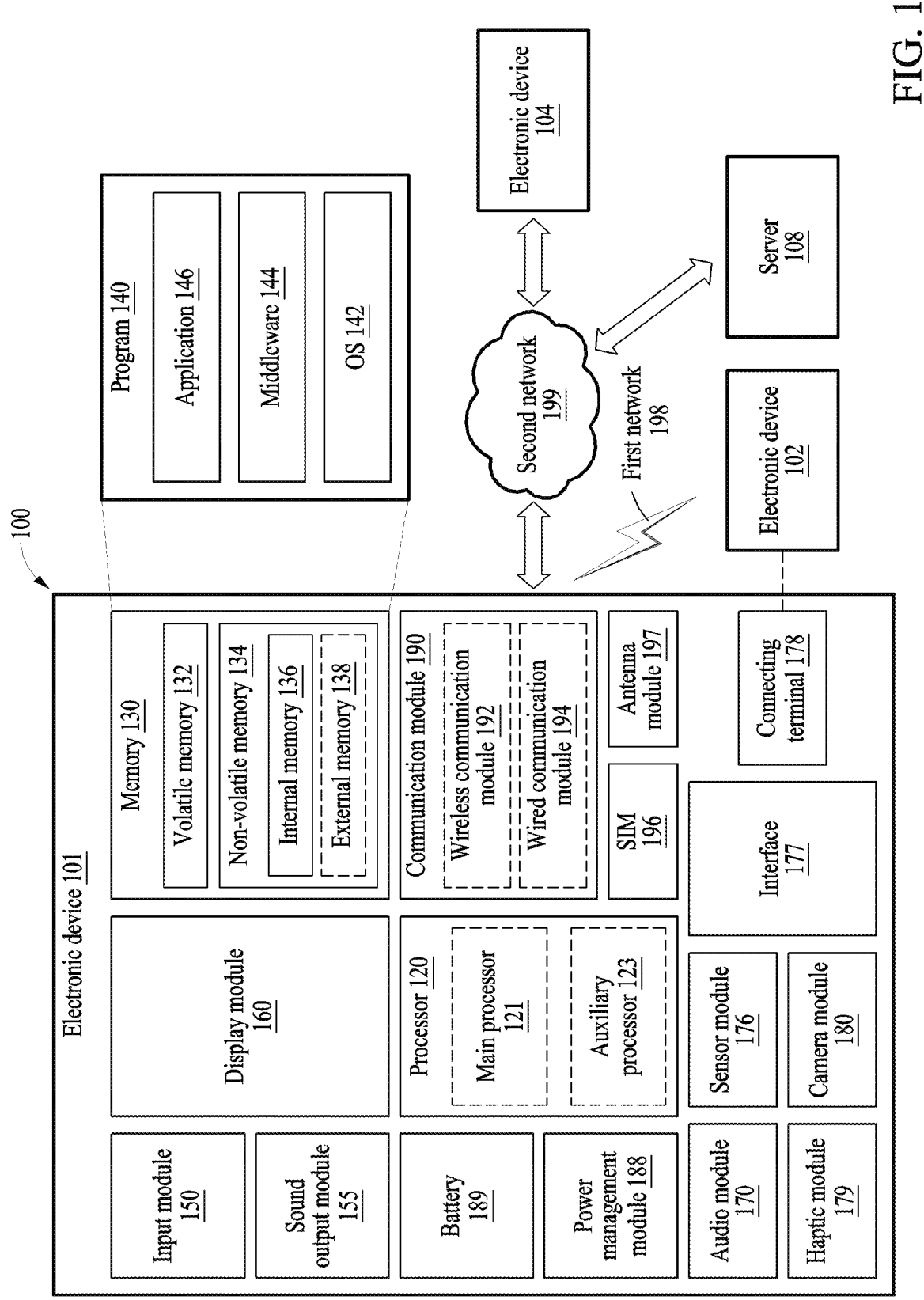
FIG. 1 is a block diagram illustrating an example electronic device in a network environment according to various embodiments.

Hereinafter, various example embodiments are described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added to the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from the outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display device 160 may include a touch sensor adapted to sense a touch, or a pressure sensor adapted to measure an intensity of a force incurred of the touch.

The audio module 170 may convert sound into an electric signal or vice versa. According to an example embodiment, the audio module 170 may obtain the sound via the input module 150 or output the sound via the sound output module 155 or an external electronic device (e.g., an electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more of specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more of lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., by wire) communication channel or a wireless communication channel between the electronic device 101 and the external electronic device (e.g., the electronic device 102, the electronic device 104, or the server 108) and performing communication via the established communication channel. The communication module 190 may include one or more of CPs that are operable independently from the processor 120 (e.g., an AP) and that support direct (e.g., by wire) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed by one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

For example, each of the external electronic devices 102 and 103 may be a device of the same type as or a different type from the electronic device 101. According to an embodiment, all or some of operations to be executed by the electronic device 101 may be executed by one or more of the external electronic devices (e.g., the electronic device 102 and 103 or a server 108 of FIG. 1). For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. For example, the external electronic device 102 may render content data executed by an application and then transmit the data to the electronic device 101, and the electronic device 101 receiving the data may output the content data to the display module. If the electronic device 101 detects a motion of a user through an inertial measurement unit (IMU) sensor, the processor of the electronic device 101 may correct the rendered data received from the external electronic device 102 based on information on the motion and output the corrected data to the display module. Alternatively, the processor may transmit the information on the motion to the external electronic device 102 and send a rendering request such that screen data is updated accordingly. According to an embodiment, the external electronic device 102 may be one of various types of electronic devices such as a smartphone or a case device that may store and charge the electronic device 101.

Figure 2:
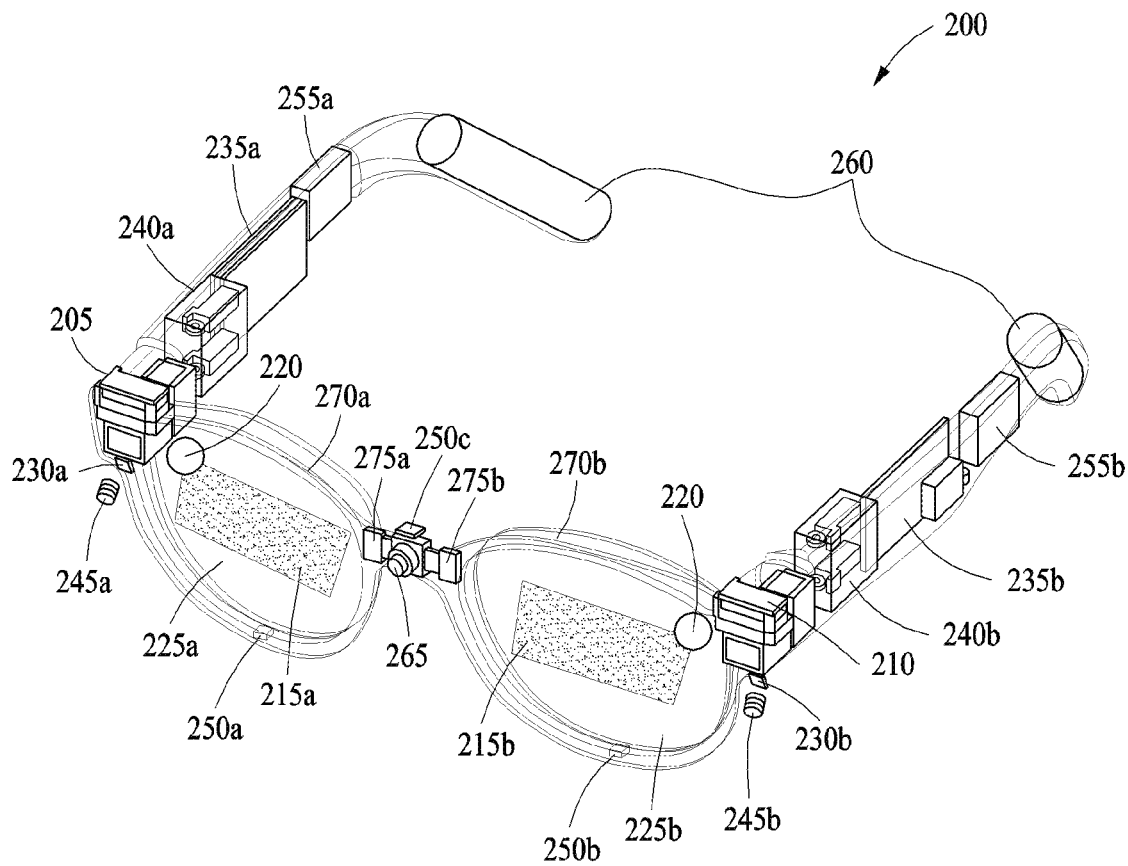
FIG. 2 is a diagram illustrating an example configuration of a wearable electronic device according to various embodiments.

FIG. 2 is a diagram illustrating an example configuration of a wearable electronic device 200 (e.g., the electronic device 101 of FIG. 1) according to various embodiments.

Referring to FIG. 2, the wearable electronic device 200 may be worn on a face of a user to provide an image associated with an AR service and/or a virtual reality service to the user.

In an embodiment, the wearable electronic device 200 may include a first display 205, a second display 210, screen display portions 215a and 215b, an input optical member 220, a first transparent member 225a, a second transparent member 225b, lighting units 230a and 230b, a first printed circuit board (PCB) 235a, a second PCB 235b, a first hinge 240a, a second hinge 240b, first cameras 245a and 245b, a plurality of microphones (e.g., a first microphone 250a, a second microphone 250b, and a third microphone 250c), a plurality of speakers (e.g., a first speaker 255a and a second speaker 255b), a battery 260, second cameras 275a and 275b, a third camera 265, and visors 270a and 270b.

In an embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, and an LCOS, the wearable electronic device 200 may include a light source configured to emit light to a screen output area of the display. In an embodiment, when the display is capable of generating light by itself, for example, when the display is either an OLED or a micro- LED, the wearable electronic device 200 may provide a virtual image with a relatively high quality to the user even though a separate light source is not included. For example, when the display is implemented as an OLED or a micro-LED, a light source may be unnecessary, which may lead to lightening of the wearable electronic device 200. Hereinafter, a display capable of generating light by itself may be referred to as a "self-luminous display", and it can be assumed that relevant descriptions are referring to a self-luminous display.

The wearable electronic device 200 may include the display, the first transparent member 225a and/or the second transparent member 225b. A user may use the electronic device while wearing the electronic device on his or her face. The first transparent member 225a and/or the second transparent member 225b may be formed of a glass plate, a plastic plate, or a polymer, and may be transparent or translucent.

According to an embodiment, the first transparent member 225a may be disposed to face a right eye of the user, and the second transparent member 225b may be disposed to face a left eye of the user. According to an embodiment, when the display is transparent, the display may be disposed to face the user's eyes to configure the screen display portions 215a and 215b.

A display (e.g., the first display 205 and the second display 210) according to an embodiment may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display includes a micro-LED.

However, the example embodiments are not limited thereto. A pixel may include R, G and B, and a single chip may be implemented by a plurality of pixels including R, G, and B pixels.

In an embodiment, the display (e.g., the first display 205 and the second display 210) may include a display area made up of pixels for displaying a virtual image, and light-receiving pixels (e.g., photo sensor pixels) that receive the light reflected from eyes disposed among pixels, convert the reflected light into electrical energy, and output light.

In an embodiment, the wearable electronic device 200 (e.g., the processor 120 of FIG. 1) may detect a gaze direction (e.g., a movement of a pupil) of the user through the light receiving pixels. For example, the wearable electronic device 200 may detect and track a gaze direction of the right eye of the user and a gaze direction of the left eye of the user through one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze).

In an embodiment, light emitted from the display (e.g., the first display 205 and the second display 210) may reach the screen display portion 215a formed on the first transparent member 225a that faces the right eye of the user, and the screen display portion 215b formed on the second transparent member 225b that faces the left eye of the user, by passing through a lens (not shown) and a waveguide. For example, the light emitted from the display (e.g., the first display 205 and the second display 210) may be reflected from a grating area formed on the input optical member 220 and the screen display portions 215a and 215b to be delivered to the user's eyes, by passing through a waveguide.

In an embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an embodiment, the screen display portions 215a and 215b or a transparent member (e.g., the first transparent member 225a and the second transparent member 225b) may include a lens including a waveguide and a reflective lens.

In an embodiment, the waveguide may function to transmit a light source generated by the display to the user's eyes. In an embodiment, the waveguide may be formed of glass, plastic, or a polymer, and may have a nanopattern formed on one inside surface or one outside surface, for example, a grating structure of a polygonal or curved shape. According to an embodiment, light incident to one end of the waveguide may be propagated inside a display waveguide by the nanopattern to be provided to the user. In an embodiment, a waveguide including a free-form prism may provide incident light to the user through a reflection mirror. The waveguide may include at least one of diffractive elements (e.g., a diffractive optical element (DOE) or a holographic optical element (HOE) or at least one of a reflective elements (e.g., a reflection mirror). In an embodiment, the waveguide may guide light emitted from the first display 205 and the second display 210 to the user's eyes, using at least one diffractive element or a reflective element included in the waveguide.

According to an embodiment, the diffractive element may include the input optical member 220 and/or an output optical member (not shown). For example, the input optical member 220 may refer to an input grating area, and the output optical member (not shown) may refer to an output grating area. The input grating area may function as an input terminal to diffract (or reflect) light output from the display (e.g., the first display 205 and the second display 210) (e.g., a micro light-emitting diode (LED)) to transmit the light to a transparent member (e.g., the transparent member 250a and the second transparent member 250b) of the screen display portions 215a and 215b. The output grating region may serve as an exit for diffracting (or reflecting), to the user's eyes, the light transmitted to the transparent members (e.g., the first transparent member 250a and the second transparent member 250b) of the waveguide.

According to an embodiment, the reflective element may include a total reflection optical element or a total reflection waveguide for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the displays 205 and 210 may be guided by the waveguide through the input optical member 220. Light traveling in the waveguide may be guided toward the eyes of the user through the output optical member. The screen display portions 215a and 215b may be determined based on light emitted toward the user's eyes.

In an embodiment, the first cameras 245a and 245b may include a camera used for 3 degrees of freedom (3DoF), head tracking of 6DoF, hand detection and tracking, gestures and/or space recognition. For example, the first cameras 245a and 245b may include a GS camera to detect a movement of a head or a hand and track the movement.

For example, a stereo camera may be applied to the first cameras 245a and 245b for head tracking and space recognition, and a camera with the same standard and performance may be applied. A GS camera having excellent performance (e.g., image dragging) may be used for the first cameras 245a and 245b to detect a minute movement such as a quick movement of a hand or a finger and to track the movement.

According to an embodiment, a rolling shutter (RS) camera may be used for the first cameras 245a and 245b. The first cameras 245a and 245b may perform a SLAM function through space recognition and depth capturing for 6 DoF. The first cameras 245a and 245b may perform a user gesture recognition function.

In an embodiment, the second cameras 275a and 275b may be used for detecting and tracking the pupil. The second cameras 275a and 275b may be referred to as a camera for eye tracking (ET). The second cameras 275a and 275b may track a gaze direction of the user. In consideration of the gaze direction of the user, the wearable electronic device 200 may position a center of a virtual image projected on the screen display portions 215a and 215b according to the gaze direction of the user.

A GS camera may be used for the second cameras 275a and 275b to detect the pupil and track a quick pupil movement. The second cameras 275a and 275b may be installed respectively for a right eye and a left eye, and a camera having the same performance and standard may be used for the second camera 275a for the left eye and the second camera 275b for the right eye.

In an embodiment, the second cameras 275a and 275b may include a gaze tracking sensor. For example, the wearable electronic device 200 may further include a lighting unit, and the gaze tracking sensor may detect a reflected light of the infrared light projected onto the user's eyes from the lighting unit. For example, the gaze tracking sensor may track a gaze direction of the user, using the reflected light.

In an embodiment, the third camera 265 may be referred to as a "high resolution (HR)" or a "photo video (PV)", and may include a high-resolution camera. The third camera 265 may include a color camera having functions for obtaining a high-quality image, such as an automatic focus (AF) and an optical image stabilizer (OIS). The example embodiments are not limited thereto, and the third camera 265 may include a global shutter (GS) camera or a rolling shutter (RS) camera.

In an embodiment, at least one sensor (e.g., a gyro sensor, an acceleration sensor, a geomagnetic sensor, a touch sensor, an illuminance sensor and/or a gesture sensor) and the first cameras 245a and 245b may perform at least one of the functions among head tracking for 6DoF, pose estimation and prediction, gesture and/or space recognition, and a simultaneous localization and mapping (SLAM) through depth imaging.

In an embodiment, the first camera 245a and 245b may be classified and used as a camera for head tracking or a camera for hand tracking.

In an embodiment, the lighting units 230a and 230b may be used differently according to positions in which the light units 230a and 230b are attached. For example, the lighting units 230a and 230b may be attached together with the first cameras 245a and 245b mounted around a hinge (e.g., the first hinge 240a and the second hinge 240b that connects a frame and a temple or around a bridge that connects frames.

If capturing is performed using a GS camera, the lighting units 230a and 230b may be used to supplement a surrounding brightness. For example, the lighting units 230a and 230b may be used in a dark environment or when it is not easy to detect a subject to be captured due to mixing of various light sources and reflected light.

In an embodiment, the lighting units 230a and 230b attached to the periphery of the frame of the wearable electronic device 200 may be an auxiliary means for facilitating detection of an eye gaze direction when the second cameras 275a and 275b capture pupils. When the lighting units 230a and 230b are used as an auxiliary means for detecting a gaze direction, an IR LED of an IR wavelength may be included.

In an embodiment, components (e.g., the processor 120 and the memory 130 in FIG. 1) of the wearable electronic device 200 may be disposed in a PCB (e.g., the first PCB 235a and the second PCB 235b). The PCB may transmit electrical signals to the components of the wearable electronic device 200. For example, the PCBs 235a and 235b may be disposed on temples, and transmit an electronic signal to each module (e.g., the first cameras 245a and 245b, the second camera 275a and 275b, the third camera 265, the first display 205, the second display 210, the first speaker 255a, the second speaker 255b, and the sensor module 176) and another PCB through a flexible PCB (FPCB).

According to an embodiment, at least one PCB may include a first board, a second board, and an interposer disposed between the first board and the second board.

In an embodiment, a plurality of microphones (e.g., the first microphone 250a, the second microphone 250b, and the third microphone 250c) may convert an external acoustic signal into electrical audio data. The electrical audio data may be variously utilized according to a function (or an application being executed) being performed by the wearable electronic device 200.

In an embodiment, a plurality of speakers (e.g., the first speaker 255a and the second speaker 255b) may output audio data that is received from a communication circuit (e.g., the communication module 190 of FIG. 1) or stored in a memory (e.g., the memory 130 of FIG. 1).

In an embodiment, one or more batteries 260 may be included, and may supply power to components of the wearable electronic device 200.

In an embodiment, the visors 270a and 270b may adjust a transmittance amount of external light incident on the user's eyes according to a transmittance. The visors 270a and 270b may be positioned in front or behind the screen display portions 215a and 215b. A front side of the screen display portions 215a and 215b may refer, for example, to a direction opposite to the user wearing the wearable electronic device 200, and a rear side of the screen display portions 215a and 215b may refer, for example, to a direction of the user wearing the wearable electronic device 200. The visors 270a and 270b may protect the screen display portions 215a and 215b and adjust the transmittance amount of external light.

For example, the visors 270a and 270b may include an electrochromic element that changes color according to applied power to adjust a transmittance. Electrochromism is a phenomenon in which an applied power triggers an oxidation-reduction reaction to change color. The visors 270a and 270b may adjust a transmittance of external light, using the color change of the electrochromic element.

For example, the visors 270a and 270b may include a control module and an electrochromic element. The control module may control the electrochromic element to adjust a transmittance of the electrochromic element.

Figure 3:
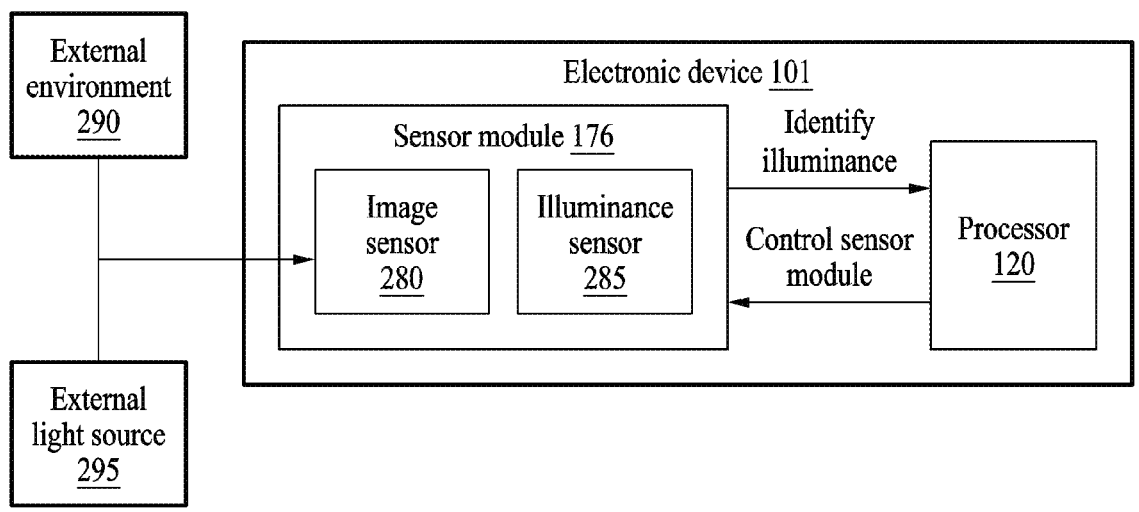
FIG. 3 is a block diagram illustrating an example operation of an electronic device according to various embodiments.

FIG. 3 is a block diagram illustrating an example operation of an electronic device (e.g., the electronic device 101 of FIG. 1) according to various embodiments.

Referring to FIG. 3, the electronic device 101 may include the sensor module (e.g., including at least one sensor) 176 and/or the processor (e.g., including processing circuitry) 120. For example, the sensor module 176 may include an image sensor 280 and/or an illuminance sensor 285.

For example, the sensor module 176 may include various sensors and measure illuminance of an external environment 290 using light received from the external environment 290 and/or an external light source 295. For example, the sensor module 176 may perform an operation based on set frames. The operation based on the set frames may include an operation of measuring the illuminance of the external environment 290 by periodically inputting external light according to a set operation period. For example, in response to operating at 60 frames per second (fps), the sensor module 176 may measure illuminance using light input every ⅟₆₀ of a second.

A frame may be understood to be substantially the same as an operation period. For example, the sensor module 176 operating at 30 fps may measure the illuminance of the external environment 290 with a period of 0.033 seconds.

The image sensor 280 may capture the external environment 290 according to the set frames. The image sensor 280 may generate an image by capturing the external environment 290. The generated image may include a plurality of pixels. The image sensor 280 may measure illuminance in each of the plurality of pixels using an Y value of a pixel, for example, a brightness value.

The illuminance sensor 285 may measure the illuminance of the external environment 290 using an intensity of input light. For example, the illuminance sensor 285 may measure the illuminance of the external environment 290 using a photoelectric effect in which electrons are generated according to energy of the input light and conductivity changes.

For example, the processor 120 may identify the illuminance of the external environment 290 measured by the sensor module 176. The processor 120 may determine whether interference is present by the external light source 295 based on the illuminance. The interference by the external light source 295 may refer, for example, to light emitted from a light-emitting device, such as a light-emitting diode of the electronic device 102, being input.

Like infrared (IR), light emitted from the external light source 295 may not be recognized by a user's eyes but may include light that may be recognized by the sensor module 176. The sensor module 176 may identify the light that may not be recognized by the user's eye and measure illuminance thereof, but the measured illuminance may be different from actual illuminance recognized by the user.

For example, in response to the interference being present by the external light source 295, the measured illuminance may be higher than actual illuminance of the external environment 290. In response to a frame-to-frame change in the measured illuminance being significant, the processor 120 may determine that the interference is present by the external light source 295.

The processor 120 may include various processing circuitry and determine whether interference is present based on a frame-to-frame change in illuminance and a set threshold value. For example, in response to the frame-to-frame change in the measured illuminance exceeding a set threshold value, the processor may determine that the interference is present by the external light source 295. The frame-to-frame change in the measured illuminance may be a difference between illuminance measured at a time t and illuminance measured in a frame immediately before the time t.

As another example, the frame-to-frame change in the measured illuminance may be a variation between the illuminance measured at the time t and illuminance measured in a frame away from the time t by a number of frames, the number of frames falling within a range of a number of set frames. For example, if the number of set frames is five, the frame-to-frame change in the measured illuminance may be a largest value among differences between the illuminance measured at the time t and illuminance measured in each of the five frames preceding the time t.

The processor 120 may determine whether interference is present based on a frame-to-frame change in brightness of the plurality of pixels and the set threshold value. The processor 120 may compare the frame-to-frame change in brightness of each of the plurality of pixels with the set threshold value. In response to the frame-to-frame change in brightness of at least one of the plurality of pixels exceeding the set threshold value, the processor 120 may determine that the interference is present by the external light source 295.

The processor 120 may determine whether the interference is present based on the frame-to-frame change in brightness of the plurality of pixels, the set threshold value, and a set percentage. For example, when an image captured by the image sensor 280 includes 100 pixels and a set percentage is 5%, the processor 120 may determine that the interference is present by the external light source 295 in response to the frame-to-frame change in brightness of at least five pixels of the plurality of pixels exceeding the set threshold value.

The threshold value may be set differently depending on the type of the electronic device 101. For example, the threshold value may be determined in consideration of an environment to which the electronic device 101 may be exposed depending on what the electronic device 101 is for, an environment in which the electronic device 101 is used, and the like. For example, when the electronic device 101 is used in an environment in which the electronic device is exposed to high power IR output from a Lidar system of an autonomous vehicle, the threshold value may be set to be high. For example, when the electronic device 101 is used in an environment in which the electronic device is exposed to IR emitted from the external electronic device 102 such as a head mount display (HMD), the threshold value may be set to be low.

The processor 120 may identify a light emitting period of the external light source 295 based on illuminance. For example, illuminance measured by the sensor module 176 may be measured as high in a frame subjected to the interference by the external light source 295 that periodically emits light and be measured as low in a frame not subjected to the interference. When the interference is present by the external light source 295, the frame in which the illuminance is measured as high and the frame in which the illuminance is measured as low may be periodically repeated. The processor 120 may identify a period of the external light source 295 using a period wherein the frame in which the illuminance is measured as high and the frame in which the illuminance is measured as low are repeated.

The processor 120 may control an operation of the sensor module 176 based on the light emitting period such that interference by the external light source 295 does not occur. The processor 120 may change frames in which the sensor module 176 identifies illuminance. The processor 120 may change a start time point at which the sensor module 176 identifies the illuminance.

For example, if the period of the external light source 295 identified when the sensor module 176 operates at 10 fps (e.g., 10 Hertz (Hz)) is five frames, the processor 120 may change the number of frames per second of the sensor module 176 to six frames, eight frames, or the like. For example, if the period of the external light source 295 identified when the sensor module 176 operates at 10 fps is 10 frames, the processor 120 may delay or advance the start time point of the sensor module 176 by 50 ms.

As described above, the electronic device 101 may exclude the interference by the external light source 295 by controlling the sensor module 176, for example, by changing a set frame period or a start time point of the sensor module 176.

The electronic device 101 may calculate (or determine) an expected interference time based on a changed set frame period and/or start time point of the sensor module 176 and the period of the external light source 295. The electronic device 101 may not identify illuminance at the expected interference time.

For example, when the changed set frame period of the sensor module 176 does not match the period of the external light source 295, the interference by the external light source 295 may occur in some frames. The electronic device 101 may calculate in which frames the interference by the external light source 295 may occur (e.g., the expected interference time) and not measure the illuminance of the external environment 290 at the expected interference time.

For example, the electronic device 101 may not capture the external environment 290 using the image sensor 280 at the expected interference time or may not measure illuminance from a captured image of the external environment 290.

Figure 4:
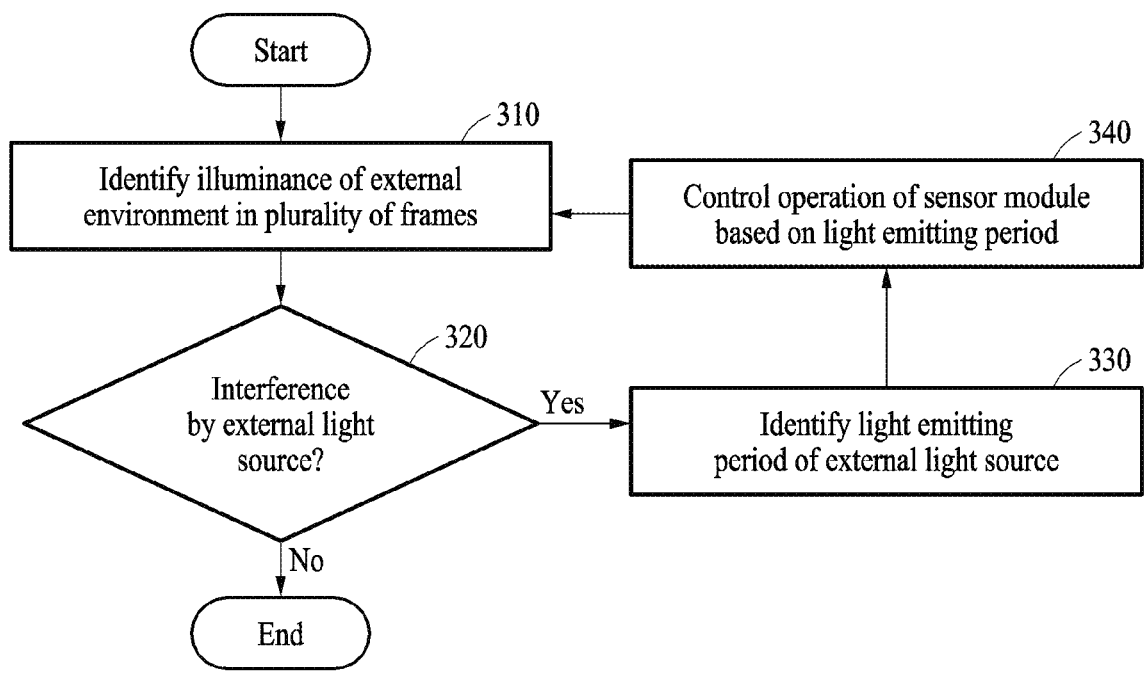
FIG. 4 is a flowchart illustrating an example operation of an electronic device to control a sensor module according to various embodiments.

FIG. 4 is a flowchart illustrating an example operation of an electronic device (e.g., the electronic device 101 of FIG. 1) to control a sensor module (e.g., the sensor module 176 of FIG. 1) according to various embodiments.

Referring to FIG. 4, in operation 310, the electronic device 101 may identify illuminance of an external environment in a plurality of frames. The electronic device 101 may identify the illuminance of the external environment using the sensor module 176. The sensor module 176 may include an image sensor (e.g., the image sensor 280 of FIG. 3) and/or an illuminance sensor (e.g., the illuminance sensor 285 of FIG. 3). The electronic device 101 may identify the illuminance of the external environment using brightness values of a plurality of pixels included in an image generated using the image sensor 280.

In operation 320, the electronic device 101 may determine whether interference is present by an external light source (e.g., the external light source 295 of FIG. 3). The electronic device 101 may determine whether the interference is present using a frame-to-frame change in illuminance and a set threshold value. For example, the external light source 295 may periodically emit light.

In response to a determination of operation 320 that no interference is present by the external light source 295, the electronic device 101 may maintain an operation of the sensor module (e.g., the sensor module 176 of FIG. 1).

In response to a determination of operation 320 that the interference is present by the external light source 295, the electronic device 101 may identify a light emitting period of the external light source 295 in operation 330. In case the external light source 295 periodically emits light, frame-to-frame illuminance may be high when light emitted from the external light source 295 reaches the sensor module 176 and low when the light does not reach the sensor module 176. Measured illuminance may have a periodicity in which case high illuminance and low illuminance repeatedly alternate according to a frame. The electronic device 101 may calculate the period of the external light source 295 using a period of the measured illuminance.

For example, when illuminance measured by the sensor module 176 operating at 10 fps (e.g., 10 Hz) is high in even frames, such as frame 2, frame 4, frame 6, frame 8, and frame 10, and low in odd frames, such as frame 1, frame 3, frame 5, frame 7, and frame 9, the period of the external light source 295 may be calculated as five frames. In the above description, frame "n" may be an n-th frame in which illuminance is identified. For example, frame 1 may indicate an operation of identifying an illuminance at 0.1 seconds.

In operation 340, the electronic device 101 may control the operation of the sensor module 176 based on a light emitting period. For example, the electronic device 101 may change frames of the sensor module 176 or a start time point of the sensor module 176. An operation of the electronic device 101 to control the sensor module 176 is described with reference to FIGS. 6A, 6B, 6C, 7A, 7B and 7C (which may be referred to as FIGS. 6A through 7C).

Figure 5:
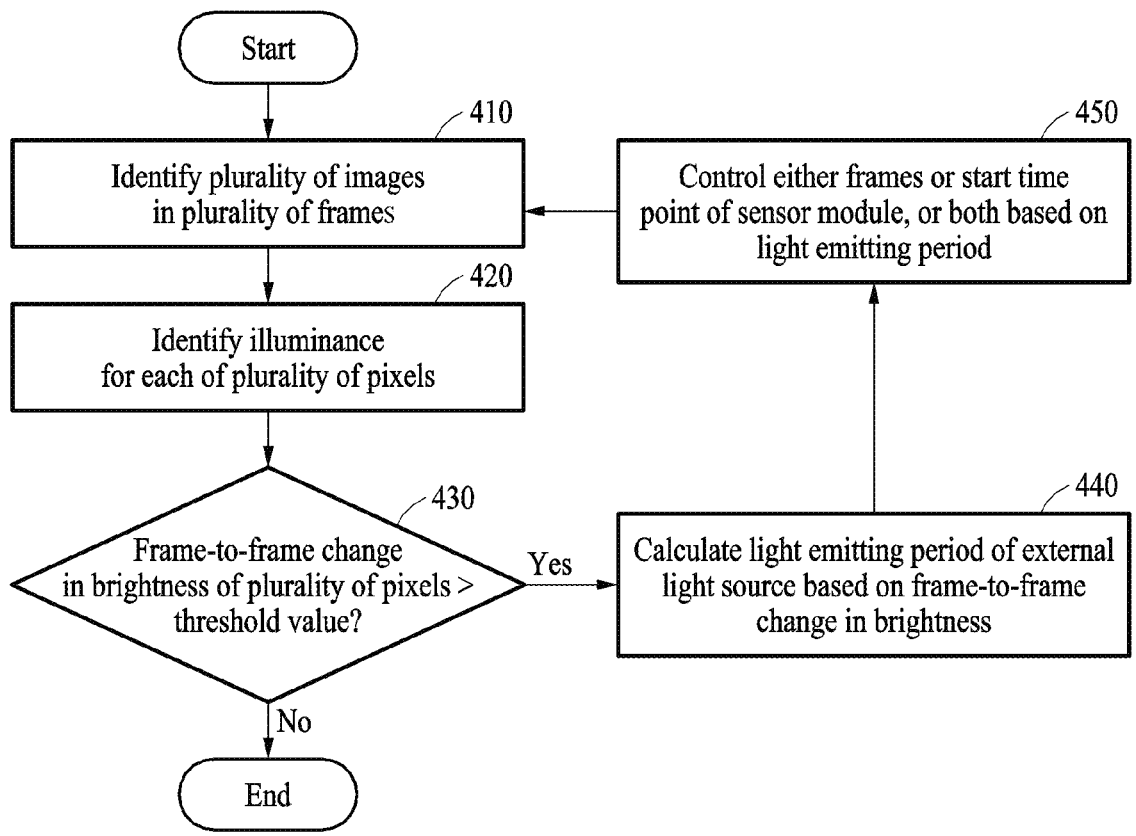
FIG. 5 is a flowchart illustrating an example operation of an electronic device to control frames or a start time point of a sensor module according to various embodiments.

FIG. 5 is a flowchart illustrating an example operation of an electronic device (e.g., the electronic device 101 of FIG. 1) to control frames or a start time point of a sensor module (e.g., the sensor module 176 of FIG. 1) according to various embodiments.

Referring to FIG. 5, in operation 410, the electronic device 101 may identify a plurality of images in a plurality of frames. For example, the electronic device 101 may identify an image obtained by capturing an external environment using an image sensor (e.g., the image sensor 280 of FIG. 2).

In operation 420, the electronic device 101 may identify illuminance for each of a plurality of pixels. The image captured by the image sensor 280 may include the plurality of pixels. The electronic device 101 may identify illuminance using Y values, for example, brightness values, of the plurality of pixels.

In operation 430, the electronic device 101 may compare a frame-to-frame change in brightness of the plurality of pixels with a set threshold value. For example, in response to the frame-to-frame change in brightness of each of the plurality of pixels exceeding the threshold value, the electronic device 101 may determine that interference is present by an external light source (e.g., the external light source 295 of FIG. 3).

When a number of pixels among the plurality of pixels is more than a set percentage, in response to a frame-to-frame change in brightness of the pixels exceeding the threshold value, the electronic device 101 may determine that the interference is present by the external light source 295.

In response to the frame-to-frame change in brightness of the plurality of pixels exceeding the threshold value in operation 430, the electronic device 101 may identify (e.g., calculate or determine) a light emitting period of the external light source 295 based on the frame-to-frame change in brightness in operation 440.

For example, in response to the interference being present by the external light source 295 that periodically emits light, a frame where illuminance is measured as high and a frame where illuminance is measured as low may periodically appear according to the period of the external light source 295. The electronic device 101 may calculate the period of the external light source 295 according to a period wherein the frame in which the illuminance is measured as low and the frame in which the illuminance is measured as high are repeated.

In operation 450, the electronic device 101 may control either frames or a start time point of the sensor module 176 or both based on the light emitting period. The electronic device 101 may allow the sensor module 176 to measure illuminance of an external environment at a time at which light, which is emitted according to the light emitting period of the external light source 295, is not being emitted.

FIGS. 6A, 6B and 6C are diagrams illustrating an example operation of an electronic device (e.g., the electronic device 101 of FIG. 1) to control a start time point of a sensor module (e.g., the sensor module 176 of FIG. 1) according to various embodiments.

FIG. 6A is a diagram illustrating a period in which an external light source (e.g., the external light source 295 of FIG. 3) operates, FIG. 6B is a diagram illustrating a period in which the sensor module 176 operates, and FIG. 6C is a diagram illustrating a period in which the sensor module 176 operates according to a changed start time point.

Referring to FIGS. 6A and 6B, the sensor module 176 that operates according to the period illustrated in FIG. 6B may be subjected to interference by the external light source 295 because light emitted from the external light source 295 is incident on the sensor module 176. Referring to FIG. 6B, illuminance in a frame 1, which is a first frame subjected to the interference by the external light source 295 and illuminance in a frame 3, which is a third frame subjected to the interference by the external light source 295 may be measured as high. Illuminance in a second frame, frame 2, may be measured as low because the light emitted from the external light source 295 is not incident on the sensor module 176.

Referring to FIGS. 6A, 6B and 6C, the electronic device 101 may change the start time point of the sensor module 176. In response to the start time point of the sensor module 176 of FIG. 6B being changed as shown in FIG. 6C, the sensor module 176 may measure illuminance of an external environment at a time different from a time at which the external light source 295 operates. FIG. 6C is a diagram illustrating that the electronic device 101 delays the start time point of the sensor module 176, but examples are not limited thereto, and the electronic device 101 may advance the start time point of the sensor module 176.

The electronic device 101 may identify an interference operation duration during which the light emitted from the external light source 295 is incident on the sensor module 176 as illustrated in FIGS. 6A and 6B. For example, the interference operation duration may be a duration during which the external light source 295 and the sensor module 176 operate simultaneously as illustrated in FIGS. 6A and 6B. The electronic device 101 may change the start time point of the sensor module 176 as shown in FIG. 6C such that a duration during which the sensor module 176 operates does not overlap the interference operation duration.

Although FIGS. 6A, 6B and 6C illustrate cases in which an operation duration of the external light source 295 and an operation duration of the sensor module 176 are the same, examples are not limited thereto. For example, the electronic device 101 may exclude the interference by the external light source 295 by changing the start time point of the sensor module 176 even when the operation duration of the external light source 295 and the operation duration of the sensor module 176 are different.

Figure 7A:
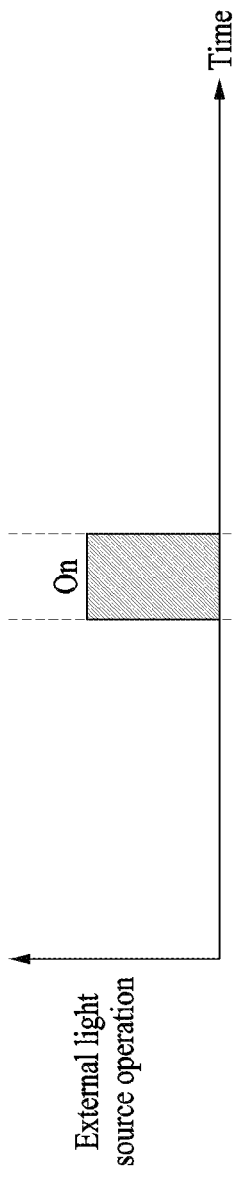
FIGS. 7A, 7B and 7C are diagrams illustrating an example operation of an electronic device to control frames of a sensor module according to various embodiments.
Figure 7B:
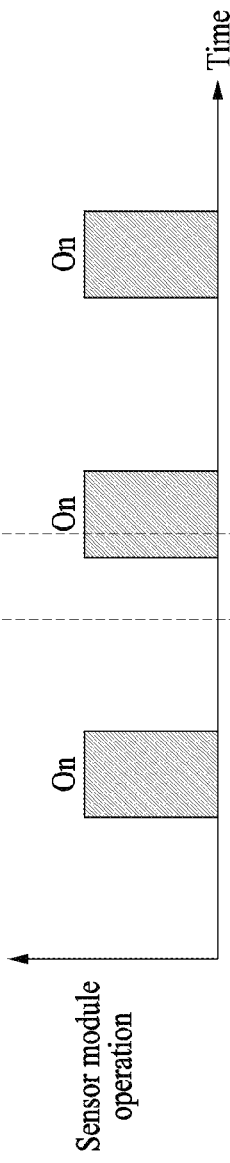
Figure 7C:
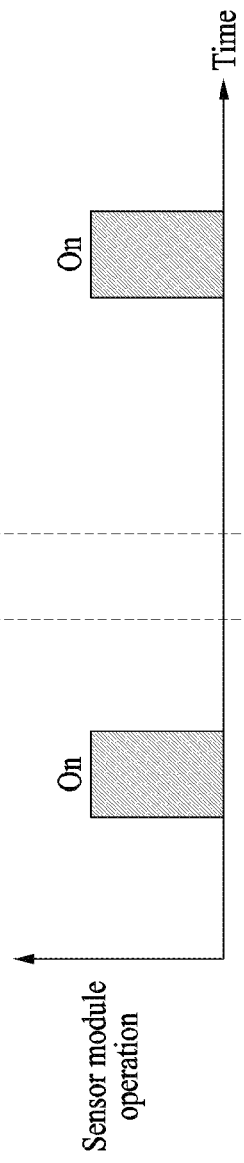

FIGS. 7A, 7B and 7C are diagrams illustrating an example operation of an electronic device (e.g., the electronic device 101 of FIG. 1) to control frames of a sensor module (e.g., the sensor module 176 of FIG. 1) according to various embodiments.

FIG. 7A is a period in which an external light source (e.g., the external light source 295 of FIG. 3) operates, FIG. 7B is a period in which the sensor module 176 operates, and FIG. 7C is a period in which the sensor module 176 operates according to changed frames.

Referring to FIGS. 7A and 7B, the sensor module 176 that operates according to the period illustrated in FIG. 7B may be subjected to interference by the external light source 295 because light emitted from the external light source 295 is incident on the sensor module 176. Referring to FIG. 7B, illuminance in frame 2, which is a second frame subjected to the interference by the external light source 295, may be measured as high. Illuminance in frame 1, which is a first frame, and illuminance in frame 3, which is a third frame, may be measured as low because the light emitted from the external light source 295 is not incident on the sensor module.

Referring to FIGS. 7A, 7B and 7C, the electronic device 101 may change frames of the sensor module 176. In response to frames of the sensor module 176 of FIG. 7B being changed as shown in FIG. 7C, the sensor module 176 may measure illuminance of an external environment at a time different from a time at which the external light source 295 operates.

Referring to FIGS. 1 to 7C, the electronic device 101 may measure illuminance of an external environment by excluding interference by the external light source 295. The electronic device may control brightness of a display (e.g., the display module 160 of FIG. 1) and transmittance of a visor (e.g., the visors 270a and 270b of FIG. 2) according to measured illuminance.

In addition, the interference by the external light source 295 may be removed from an image of the external environment captured by the electronic device 101 using the image sensor 280. The electronic device 101 may improve recognition performance of head/hand tracking using an image from which the interference by the external light source 295 is excluded.

According to an example embodiment, an electronic device (e.g., the electronic device 101 of FIG. 1 and the wearable electronic device 200 of FIG. 2) may include: a sensor module (e.g., the sensor module 176 of FIG. 1) including at least one sensor configured to identify an illuminance of an external environment, a processor (e.g., the processor 120 of FIG. 1) operatively connected to the sensor module, and a memory (e.g., the memory 130 of FIG. 1) operatively connected to the processor and storing instructions executable by the processor, wherein the processor is configured to: identify the illuminance in a plurality of frames using the sensor module, determine, based on the illuminance, whether interference is present by an external light source (e.g., the external light source 295 of FIG. 3) that periodically emits light, identify, based on the illuminance, a light emitting period of the external light source, and control, based on the light emitting period, an operation of the sensor module such that the interference by the external light source does not occur.

The processor may be configured to determine whether the interference is present based on a frame-to-frame change in the illuminance and a set threshold value.

The processor may be configured to identify a plurality of images obtained by capturing the external environment and identify illuminance for each of a plurality of pixels included in the plurality of images.

The processor may be configured to determine whether the interference is present based on a frame-to-frame change in brightness of the plurality of pixels and a set threshold value.

The processor may be configured to calculate the light emitting period based on a period of a frame-to-frame change in the illuminance.

The processor may be configured to change the plurality of frames in which the sensor module identifies the illuminance.

The processor may be configured to change a start time point at which the sensor module identifies the illuminance.

The electronic device may further include: a visor (e.g., the visors 270a and 270b of FIG. 2) configured to adjust a transmittance amount of external light incident of an eye of a user based on a transmittance, and the processor may be configured to: determine the transmittance based on the illuminance.

According to an example embodiment, an electronic device (e.g., the electronic device 101 of FIG. 1 and the wearable electronic device 200 of FIG. 2) may include: a sensor module (e.g., the sensor module 176 of FIG. 1) including at least one sensor configured to identify illuminance using a plurality of images obtained by capturing an external environment, a processor (e.g., the processor 120 of FIG. 1) operatively connected to the sensor module, and a memory (e.g., the memory 130 of FIG. 1) operatively connected to the processor and storing instructions executable by the processor, wherein the processor may be configured to: identify the illuminance for each of a plurality of pixels included in the plurality of images in a plurality of frames, determine, based on the illuminance, whether interference is present by an external light source (e.g., the external light source of FIG. 3) that periodically emits light, identify, based on the illuminance, a light emitting period of the external light source, and change the plurality of frames or a start time point at which the sensor module identifies the illuminance such that the interference by the external light source does not occur.

The processor may be configured to determine whether the interference is present based on a frame-to-frame change in the illuminance and a set threshold value.

The processor may be configured to determine whether the interference is present based on a frame-to-frame change in brightness of the plurality of pixels and a set threshold value.

The processor may be configured to calculate the light emitting period based on a period of a frame-to-frame change in the illuminance.

The electronic device may further include: a visor (e.g., the visors 270a and 270b of FIG. 2) configured to adjust a transmittance amount of external light incident on an eye of a user according to a transmittance, and the processor may be configured to determine the transmittance based on the illuminance.

According to an example embodiment, a method of removing interference may include: identifying illuminance of an external environment in a plurality of frames using a sensor module (e.g., the sensor module 176 of FIG. 1), determining, based on the illuminance, whether interference is present by an external light source (e.g., the external light source 295 of FIG. 3) that periodically emits light, identifying, based on the illuminance, a light emitting period of the external light source, and controlling, based on the light emitting period, an operation of the sensor module such that the interference by the external light source does not occur.

The determining of whether the interference is present may include determining whether the interference is present based on a frame-to-frame change in the illuminance and a set threshold value.

The identifying of the illuminance of the external environment may include identifying a plurality of images obtained by capturing the external environment and identifying illuminance for each of a plurality of pixels included in the plurality of images.

The determining of whether the interference is present may include determining whether the interference is present based on a frame-to-frame change in brightness of the plurality of pixels and a set threshold value.

The identifying of the light emitting period may include calculating the light emitting period based on a period of a frame-to-frame change in the illuminance.

The controlling of the sensor module may include changing the plurality of frames in which the sensor module identifies the illuminance.

The controlling of the sensor module may include changing a start time point at which the sensor module identifies the illuminance.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more of instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more of functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device, comprising:
a sensor module comprising at least one sensor configured to identify illuminance of an external environment;
a processor, comprising processing circuitry, operatively connected to the sensor module;
a memory operatively connected to the processor and storing instructions executable by the processor,
wherein the processor comprises at least one processor and is individually and/or collectively configured to:
identify the illuminance in a plurality of frames based on brightness values of a plurality of pixels of the frames using the sensor module;
determine, in response to a frame-to-frame change in the measured illuminance exceeding a set threshold value, whether interference is present by an external light source that periodically emits light, wherein the frame-to-frame change is a largest value among differences of the illuminance measured within a range of a number of set frames;
calculate, based on the period of the frame-to-frame change in the illuminance, a light emitting period of the external light source;
control, based on the light emitting period, a set frame period and a start time point of the sensor module such that the interference by the external light source does not occur;
determine an expected interference time based on the set frame period, the start time point of the sensor module and the light emitting period of the external light source;
skip measuring the illuminance of the external environment at the expected interference time; and
control brightness of a display included in the wearable electronic device and transmittance of a visor included in the wearable electronic device according to the measured illuminance of the external environment.

2. The electronic device of claim 1, wherein the processor is configured to: identify a plurality of images obtained by capturing the external environment; and identify illuminance for each of a plurality of pixels included in the plurality of images.

3. The electronic device of claim 1, further comprising:
the visor configured to adjust a transmittance amount of external light incident on an eye of a user based on the transmittance.

4. A method of reducing interference of a wearable electronic device, the method comprising:
identifying illuminance of an external environment in a plurality of frames based on brightness values of a plurality of pixels of the frames using a sensor module;
determining, in response to a frame-to-frame change in the measured illuminance exceeding a set threshold value, whether interference is present by an external light source that periodically emits light, wherein the frame-to-frame change is a largest value among differences of the illuminance measured within a range of a number of set frames;
calculating, based on the period of the frame-to-frame change in the illuminance, a light emitting period of the external light source;

controlling, based on the light emitting period, a set frame period and a start time point of the sensor module such that the interference by the external light source does not occur;

determining an expected interference time based on the set frame period, the start time point of the sensor module and the light emitting period of the external light source;

skipping measuring the illuminance of the external environment at the expected interference time; and controlling brightness of a display included in the wearable electronic device and transmittance of a visor included in the wearable electronic device according to the measured illuminance of the external environment.

5. The method of claim 4, wherein the identifying of the illuminance of the external environment comprises:

identifying a plurality of images obtained by capturing the external environment; and identifying illuminance for each of a plurality of pixels included in the plurality of images.

* * * * *